(12) United States Patent
Rüttiger et al.

(10) Patent No.: US 7,256,385 B2
(45) Date of Patent: Aug. 14, 2007

(54) DISPLAY DEVICE WITH COMBINED LIGHT GUIDE

(75) Inventors: Anton Rüttiger, Wildflecken (DE); Jürgen Nauth, Burkardroth (DE)

(73) Assignee: PREH GmbH, Bad Neustadt a.d. Saale (DE)

( * ) Notice: Subject to any disclaimer, the term of this patent is extended or adjusted under 35 U.S.C. 154(b) by 0 days.

(21) Appl. No.: 11/372,274

(22) Filed: Mar. 10, 2006

(65) Prior Publication Data

US 2006/0208166 A1    Sep. 21, 2006

Related U.S. Application Data

(63) Continuation of application No. PCT/EP04/09980, filed on Sep. 8, 2004.

(30) Foreign Application Priority Data

Sep. 10, 2003    (DE) ................. 103 41 622

(51) Int. Cl.
*G01J 1/44* (2006.01)
*G02B 6/00* (2006.01)
*G02B 7/02* (2006.01)
*F21V 7/04* (2006.01)

(52) U.S. Cl. ............... 250/214 AL; 385/12; 362/552

(58) Field of Classification Search ......... 250/214 AL; 362/552, 555; 385/12

See application file for complete search history.

(56) References Cited

U.S. PATENT DOCUMENTS

| | | | |
|---|---|---|---|
| 6,195,016 B1 * | 2/2001 | Shankle et al. | 340/815.42 |
| 6,686,731 B2 * | 2/2004 | Tacconi | 324/142 |
| 2001/0022731 A1 * | 9/2001 | Dupay | 362/560 |
| 2003/0222772 A1 * | 12/2003 | Laufer | 340/435 |
| 2004/0085752 A1 * | 5/2004 | Fuwausa et al. | 362/84 |

FOREIGN PATENT DOCUMENTS

| | | |
|---|---|---|
| DE | 29 23 986 | 3/1980 |
| DE | 41 40 647 | 6/1993 |
| DE | 101 60 296 A1 | 6/2003 |
| EP | 0 115 575 A2 | 8/1984 |
| JP | 2000076912 A * | 3/2000 |

* cited by examiner

*Primary Examiner*—Thanh X. Luu
*Assistant Examiner*—Brian Livedalen
(74) *Attorney, Agent, or Firm*—McGrath, Geissler, Olds & Richardson, PLLC

(57) ABSTRACT

An indicating instrument including a light guiding system having at least a first and second light guides, a sensor disposed at a first end of the first light guide and configured to receive incident ambient light that has traveled through the first light guide, a light-emitting device disposed at a first end of the second light guide and configured to emit light through the second light guide, and a covering body disposed at a second end of the first and second light guides that is opposite to the first ends. Further, the incident ambient light is incident upon the covering body and travels through the first light guide and is received by the sensor, and the light emitted by the light-emitting unit travels through the second light guide and exits the covering body.

19 Claims, 1 Drawing Sheet

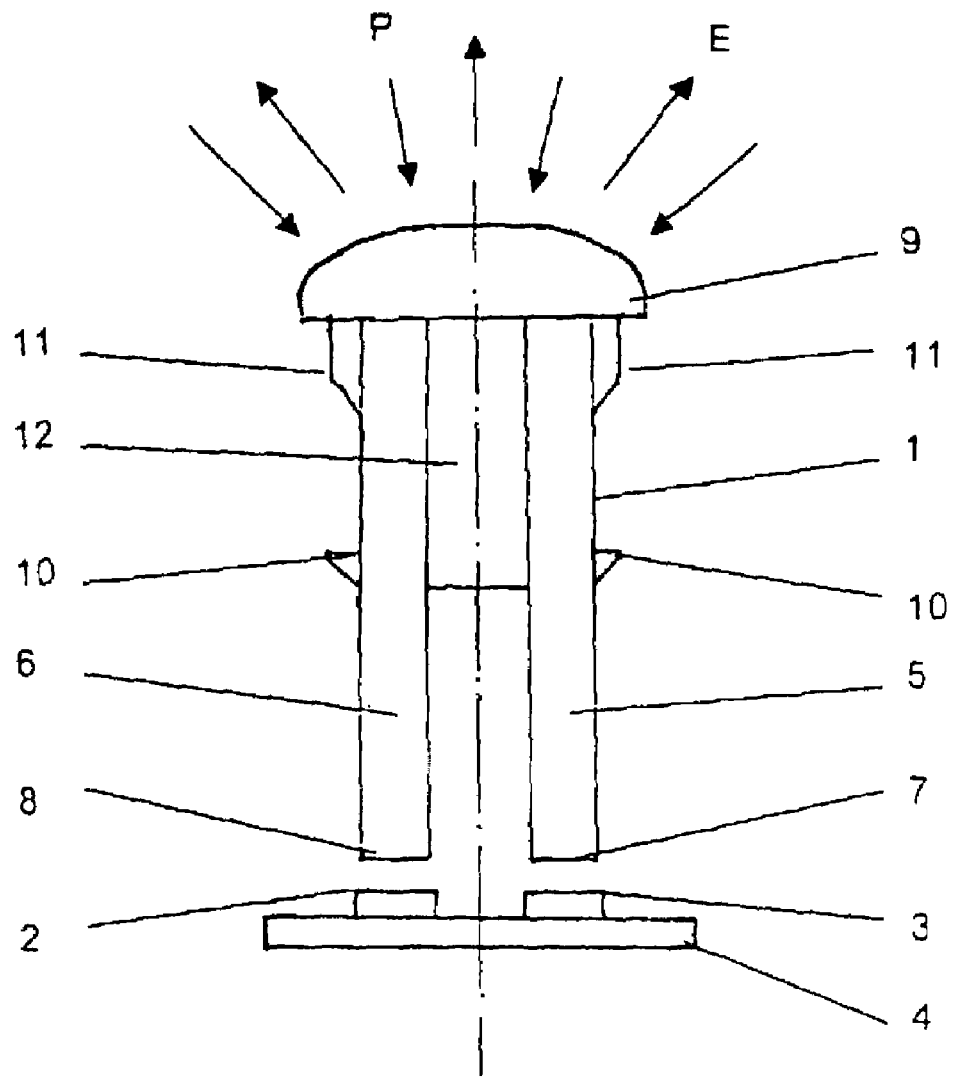

DISPLAY DEVICE WITH COMBINED LIGHT GUIDE

This non-provisional application is a continuation application of PCT/EP2004/009980, which was filed on Sep. 8, 2004, and which claims priority to German Patent Application No. DE 10341622.6, which was filed in Germany on Sep. 10, 2003, and which are both herein incorporated by reference.

BACKGROUND OF THE INVENTION

1. Field of the Invention

The present invention relates to an indicating instrument with a light guide and sensor to determine if ambient light exists and that emits a control signal to an evaluation circuit for controlling a brightness of the indicating instrument based on the determined ambient light.

2. Description of the Background Art

European Patent EP 0 115 575 B1 discloses a light guiding system that detects light incident at both ends of a light guide so light passing through the windshield of a motor vehicle and also light directed in front of the dashboard is detected. Thus, in this system, the light guide includes two laterally placed sensors to detect the light approaching from different angles. The two sensors then produce an electrical signal, which is evaluated to control the brightness of the indicating instrument.

German patent publication DE 41 40 647 C2 discloses a light guiding system that detects ambient light in front of a display. In addition, the brightness of the display device is controlled based on the amount of detected light. Further, the above two light guide systems are used exclusively to control the brightness of a corresponding indicating instrument, and are integrated into or placed at the corresponding indicating instrument.

In addition, the indicating instruments display features regarding the operation of the motor vehicle. For example, the indicating instruments may indicate to an operator of the vehicle the optimal time to shift gears. This is accomplished via a shift control device associated with the vehicle transmission. One type of such a shift control device is disclosed in the German patent publication DE 29 23 986 C2. In this publication, the optimal shifting time for switching to a lower or higher gear is displayed to the operator. These type of displays generally include a lamp, which lights up to indicate to the operator that a necessary upshift or downshift is needed.

SUMMARY OF THE INVENTION

It is therefore an object of the present invention is to minimize the amount of operating displays in a motor vehicle and simultaneously to provide an indicating instrument that can be cost-efficiently manufactured and that can assist the operator in operating the vehicle.

Another object of the present invention is to provide an indicating instrument that has an area into which light is introduced into an interior of the indicating instrument and is detected via a light guide and corresponding sensor. Thus, in accordance with one aspect of the present invention, the intensity of the ambient light can be efficiently measured and the light guide simultaneously functions as a functional component in the indicating instrument.

Further, the light guide is integrated within the indicating instrument such that the light guide can be seen by the vehicle driver. In addition, the sensor is placed at the end of the light guide and detects the incident light, and the brightness of the indicating instrument is controlled based on the light detected by the sensor. Also, the indicating instrument includes a first rod-shaped light guide for receiving and detecting incident light and a second rod-shaped light guide used for illuminating the indicating instrument. Therefore, because the light guides are visible to the operator of the vehicle, the light guides may also be used to notify the operator that is gear shift operating is recommended. The light guides may also be used as an antitheft alarm (e.g., to appear flashing thereby notifying other people the vehicle is equipped with an operating antitheft alarm).

Further, in one aspect of the present invention, the light guide is formed with a light-conducting plastic and includes the above-noted two parallel virtually cylindrical light guide rods approximately equal in length. In addition, the two light guide rods are connected at one end thereof so that a one-piece component is formed. Further, a dome-shaped or round-shaped body is also preferably attached to the end of the light guide rods that is facing the operator of the vehicle. That is, the dome-shaped or round-shaped body is preferable because it absorbs and scatters as much light as possible. Thus, the operator is able to easily see the indicating instrument.

In addition, the dome-shaped area can be integrated directly into the indicating instrument or be placed at the indicating instrument. Further, the light guide end opposite to the dome-shaped area is provided with planar surfaces. That is, the light guide has two separate ends (i.e., the two separate light guide rods having planar surfaces have a perpendicular end face in regard to a central axis of the cylindrical shape). Thus, a sensor may be placed below or directly to the end face of the first light guide rod to thereby detect incident light. Further, a light-emitting element may be placed below or directly to the end face of the other light guide rod to thereby emit light and illuminate the indicating instrument. Also, a light-emitting diode (LED) may be used as the lighting-emitting element and the light detecting sensor may be a phototransistor, for example.

In addition, the light guide may also include retaining elements to assist in the easy assembly of the light guide into the indicating instrument. The retaining elements also stabilize the light guide within the indicating instrument and prevent the light guide from being inserted incorrectly into the indicating instrument. In addition, as noted above, the light guide rods may be attached to one another, thereby stabilizing the light guide itself. Further, the connected part of the light guide rods may also be used to improve the light scattering capabilities of the light guide.

BRIEF DESCRIPTION OF THE DRAWING

The present invention will become more fully understood from the detailed description given hereinbelow and the accompanying drawing which is given illustration only, and thus, is not limitive of the present invention, and wherein:

The FIGURE is a cross-sectional side view of a light guide in accordance with an embodiment of the present invention.

DETAILED DESCRIPTION

As shown in the FIGURE, the light guide 1 includes a phototransistor 2 and an LED 3 mounted on a board 4, which is affixed in an indicating instrument (not shown). The light guide 1 also includes two rod-shaped light guides 5, 6, which have planar end faces 7, 8 placed directly over the phototransistor 2 and the LED 3. In addition, as shown in the FIGURE, a dome-shaped solid body 9 is placed at the other ends of the rod-shaped light guides 5, 6. In one example, the light guides 5, 6 and the dome-shaped solid body 9 are formed as a single piece so that an additional interface is not formed in the light guide. In addition, the solid body 9 does not necessarily have to be dome-shaped. For example, the solid body 9 may have a planar shape to facilitate the integration of the light guide 1 into the indicating instrument. Alternatively, the solid body 9 may have another desirable shape based on aesthetic reasons, for example.

In addition, the light guide 1 also includes retaining elements 10, 11 on outer surfaces of the rod-shaped light guides 5, 6. The retaining elements 10, 11 are used to secure the light guide 1 in the indicating instrument, and can also be used to guide the light guide 1 into the indicating instrument. Further, although the FIGURE illustrates the retaining elements 10, 11 being identical with each other on each side of the rod-shaped light guides 5, 6, the retaining elements 10, 11 may be formed to have a different shape from each other to allow, for example, an oriented installation of the light guide 1 into the indicating instrument. Also, the light guides 5, 6 are connected to one another via a subsection 12, which stabilized the light guide 1.

Further, as shown in the FIGURE, the light guide 1 is configured to receive ambient light P that is passed on via the rod-shaped light guide 6 to the phototransistor 2. Then, the phototransistor 2 detects the received ambient light and generates a control signal that is passed to an evaluating circuit (not shown). The evaluating circuit then controls the brightness of the indicating instrument by activating (or deactivating) the LED 3. When the LED 3 is activated, the light emitted by the LED 3 passes through the rod-shaped light guide 5 and is scattered by the dome-shaped solid body 9 (see the Light E in the FIGURE). Thus, the vehicle operator clearly sees the indicating instrument. The LED 9 may also be controlled to flash as discussed above.

Further, in accordance with embodiments of the present invention, the light guide 1 may be advantageously used to provide several functions. For example, the light guide 1 may be implemented as a gear shift indicator. In more detail, the light guide 1 may be configured to flash or light up using the LED 3 to thereby indicate to the vehicle driver to perform a gear shifting operation. The light guide 1 may also be advantageously used as an antitheft alarm device. For example, the light guide 1 may be configured to flash via the LED 3 while the vehicle is not in operation and thus indicate that vehicle is protected by an antitheft alarm device.

In addition, the light guide 1 is controlled by the evaluation circuit and/or a corresponding control circuit. For example, the evaluation circuit may be configured to receive and evaluate signals sent by the photo transistor 2. The evaluation circuit may then determine that the indicating instrument should be illuminated and send this information to the control circuit. The control circuit may then activate the LED 3 by applying a certain control signal. The control circuit may also determine via a shift control device that a shift operation should preferably be performed by the operator. In this instance, the control circuit can activate/deactivate the LED 3 to thereby make the light guide 1 flash. For example, the control circuit may apply a pulse-shaped signal to the LED 3 to have the LED 3 turn on and off in a repeating pattern. The control circuit may also change the duration between pulses to make the light guide 1 quickly or slowly flash. For example, the control circuit may control the LED 3 to flash slowly to inform the operator a shifting operation should be performed soon, and then control the LED 3 to flash quickly to inform the operator a shifting operation should occur immediately.

In addition, when the LED 3 is being turned on by the control circuit, the signals from the phototransistor are preferably not evaluated (e.g., during the pulsed time period). Further, during the time between pulses, the signals from the phototransistor 2 may be evaluated. Thus, the phototransistor 2 and the LED 3, which are disposed near each other, are individually operated. Therefore, there is less likelihood the heat from one element negatively affects the performance of the other element. Further, when the LED 3 is being controlled and is emitting the light E, the vehicle driver is informed about a gear shifting operation but does not perceive the determination of the ambient brightness. That is, the adaptation of the indicating instrument to the brightness of the environment is only indirectly detected by the vehicle driver.

Therefore, in accordance with the present invention, the light guide 1 is thereby capable of minimizing the number of operating displays in the indicating instrument. Further, the light guide 1 may be used to perform a plurality of different functions. In addition, the light guide 1 may be cost-efficiently manufactured and easily integrated into an instrument panel. The operator of the vehicle is also easily able to find his or her way on the indicating instrument. This is particularly advantageous when the motor vehicle is used by several different people.

Also, the light emission E is particularly improved by using the dome-shape solid body 9, because the light E emitted by the LED scatters over a large angle and thereby is easily seen by the vehicle driver. Further, the light guide 1 is preferably made of a transparent, light-conducting plastic.

The invention being thus described, it will be obvious that the same may be varied in many ways. Such variations are not to be regarded as a departure from the spirit and scope of the invention, and all such modifications as would be obvious to one skilled in the art are to be included within the scope of the following claims.

What is claimed is:

1. An indicating instrument, comprising:
 a light guide, which includes two cylindrical rod-shaped light guides, having a sensor and a light-emitting device placed at one end of the light guide, said sensor configured to receive ambient light incident on the other end of the light guide, and said light-emitting device configured to emit light out of the other end of the light guide based on the ambient light detected by the sensor, wherein a central axis of the light guide extends from the one end to the other end, and further wherein a longitudinal side of each of the cylindrical rod-shaped light guides extend substantially parallel to the central axis.

2. The indicating instrument according to claim 1, wherein the cylindrical rod-shaped light guides are connected together at said other end of the light guide.

3. The indicating instrument according to claim 1, wherein the rod-shaped light guides have end faces perpendicular to the central axis of the light guide, and wherein the sensor is placed directly under one end face and the light-emitting device is placed directly under the other end face of the rod-shaped light guides.

4. The indicating instrument according to claim 1, wherein the light-emitting device comprises a Light Emitting Diode (LED).

5. The indicating instrument according to claim 1, wherein the sensor comprises a phototransistor.

6. The indicating instrument according to claim 1, the light guide further includes an attaching mechanism at sides of the rod-shaped light guides and turned away from each other.

7. The indicating instrument according to claim 1, wherein the light guide is formed of a light-conducting plastic.

8. The indicating instrument according to claim 1, wherein the light guide is included in a motor vehicle.

9. An indicating instrument, comprising: a light guiding system having at least first and second light guides; wherein the first and second light guides have a first and second central axis, respectively, further wherein the first and second central axis are substantially congruent; a sensor disposed at a first end of the first light guide and configured to receive incident ambient light that has traveled through the first light guide; a light-emitting device disposed at a first end of the second light guide and configured to emit light through the second light guide; wherein the light-emitting device is controlled based on whether or not the sensor detects ambient light; and a covering body disposed at a second end of the first and second light guides that is opposite to the first ends.

10. The indicating instrument according to claim 9, wherein the incident ambient light is incident upon the covering body and travels through the first light guide and is received by the sensor, and wherein the light emitted by the light-emitting unit travels through the second light guide and exits the covering body.

11. The indicating instrument according to claim 9, wherein the covering body is a round-shaped or dome-shaped solid body.

12. The indicating instrument according to claim 9, wherein the first and second light guides are parallel with each other and have a cylindrical rod-shape.

13. The indicating instrument according to claim 9, wherein the first and second light guides are joined together at their second ends.

14. The indicating instrument according to claim 9, wherein the light-emitting device comprises a Light Emitting Diode (LED), and the sensor comprises a phototransistor.

15. The indicating instrument according to claim 9, further comprising:

an attaching mechanism formed on sides of the first and second light guides.

16. The indicating instrument according to claim 9, wherein the light guiding system is formed of a light-conducting plastic.

17. The indicating instrument according to claim 9, wherein the right guiding system is included in a motor vehicle.

18. The indicating instrument according to claim 9, wherein the light-emitting device is controlled to consecutively emit light in increments to thereby cause the light guiding system to repeatedly flash.

19. The indicating instrument according to claim 18, wherein the light-emitting device is caused to repeatedly flash to inform an operator of a vehicle that a gear shift operation needs to be performed.

* * * * *